United States Patent [19]

Hassler et al.

[11] Patent Number: 5,392,346
[45] Date of Patent: Feb. 21, 1995

[54] MOBILE LOG-IN CAPABILITY FEATURING FIXED PHYSICAL (TERMINAL-DEPENDENT) TRANSLATIONS AND PORTABLE LOGICAL (USER-DEPENDENT) TRANSLATIONS

[75] Inventors: Kerry W. Hassler, Boulder; Cynthia C. Jones, Brighton; Joylee E. Kohler, Broomfield; Robert D. Nalbone, Thornton, all of Colo.

[73] Assignee: AT&T Corp., Murray Hill, N.J.

[21] Appl. No.: 249,646

[22] Filed: May 26, 1994

Related U.S. Application Data

[63] Continuation of Ser. No. 841,140, Feb. 25, 1992, abandoned.

[51] Int. Cl.⁶ .............................................. H04M 3/42
[52] U.S. Cl. .................................. 379/265; 379/207; 379/211; 379/196; 379/198
[58] Field of Search ............... 379/207, 265, 211, 196, 379/198, 188, 34

[56] References Cited

U.S. PATENT DOCUMENTS

| | | | |
|---|---|---|---|
| 3,692,946 | 9/1972 | Budrys | 379/196 |
| 3,975,595 | 8/1976 | Berube | 379/244 |
| 4,064,372 | 12/1977 | Altenburger | 379/196 |
| 4,313,035 | 1/1982 | Jordan | 179/18 BE |
| 4,451,705 | 5/1984 | Burke | 179/27 D |
| 4,486,626 | 12/1984 | Kohler | 379/196 |
| 4,510,351 | 4/1985 | Costello | 179/27 D |
| 4,694,483 | 9/1987 | Cheung | 379/34 |
| 4,736,405 | 4/1988 | Akiyama | 379/211 |
| 4,754,479 | 6/1988 | Bicknell | 379/207 |
| 4,755,985 | 7/1988 | Jayapalan | 370/58 |
| 4,878,239 | 10/1989 | Solomon | 379/211 |
| 4,899,373 | 2/1990 | Lee et al. | 379/207 |
| 4,933,967 | 6/1990 | Lo | 379/207 |
| 4,955,047 | 9/1990 | Morganstein | 379/198 |
| 4,959,856 | 9/1990 | Bischoff | 379/258 |
| 5,008,930 | 4/1991 | Gawrys | 379/211 |
| 5,012,511 | 4/1991 | Hanle | 379/211 |
| 5,017,917 | 5/1991 | Fisher | 379/197 |
| 5,027,345 | 6/1991 | Littlewood | 370/58.2 |
| 5,099,511 | 3/1992 | Matsumoto | 379/198 |
| 5,200,995 | 4/1993 | Gaukel | 379/188 |

OTHER PUBLICATIONS

Chap 6 Agent Set Functionality Oct. 13, 1989.
Unix Shell Programming, Hayden Book Co. by Stephen G. Kochan & Patrick H. Wood.
Unifi Pro Server TM.
Aspect Call Center Product Specification, Aspect Telecommunications, San Jose, Calif. (Oct. 13, 1989) pp. 44–49, 57–63, and FIGS. 6.1–6.11.
S. G. Kochan et al., UNIX TM Shell Programming, Hayden Book Co. (1985), pp. 252–253.
Unifi PhoneServer TM, product brochure (including reprints), Unifi Communications Corp. (1991).

Primary Examiner—James L. Dwyer
Assistant Examiner—Michael N. Lau
Attorney, Agent, or Firm—David Volejnicek

[57] ABSTRACT

In a telecommunications system that includes a plurality of user terminals and terminal translations that define attributes of the individual terminals, shared use of the terminals by a plurality of users, or use by a user of different ones of the terminals at different times, is facilitated. Each terminal's physical translations, which include for each terminal those attributes that are independent of the users of the terminal and which include a physical extension number, are associated with the corresponding terminals. Each terminal's default terminal translations, which include for each terminal those attributes that are dependent on the users of the terminal and which include a call-coverage path, also are associated with the corresponding terminals. Each user's logical translations, which include for each user those attributes that are independent of the terminals used by the user and which include a logical extension number and a call-coverage path, are associated with the corresponding users. Prior to a user logging on at a terminal, call processing uses the terminal's associated physical and default terminal translations to process calls originating at the terminal or addressed to the terminal, and redirects calls addressed to the user to the call-coverage path specified in the user's logical translations. Subsequent to a user logging on at a terminal, call processing uses the terminal's associated physical translations and the user's associated logical translations to process calls originating at the terminal or addressed to the user, and continues to use the terminal's associated physical and default terminal translations to process calls addressed to the terminal.

34 Claims, 6 Drawing Sheets

MOBILE LOG-IN CAPABILITY FEATURING FIXED PHYSICAL (TERMINAL-DEPENDENT) TRANSLATIONS AND PORTABLE LOGICAL (USER-DEPENDENT) TRANSLATIONS

This application is a continuation of application Ser. No. 07/841,140, filed Feb. 25, 1992, now abandoned.

TECHNICAL FIELD

This invention is related to telecommunications systems that include user telecommunications terminals, such as end-user telephone systems.

BACKGROUND OF THE INVENTION

In many places and situations where telecommunications are used, a number of people share the use of a plurality of telecommunications terminals. For example: in telemarketing systems such as automatic call-distribution (ACD) systems, individual agents can serve calls from any terminal in the system; on a factory floor, all workers share use of a limited number of telephones; in a security system, at a commercial building or a prison, security guards must be able to perform their function at any of the system's telecommunications terminals; and in a field sales office where salespersons spend most of their time in the field, the office is often efficiently equipped with only a small number of desks each one of which has a voice and data terminal, and individual salespeople, when they are in the office, use whichever desks are not occupied at that time.

Since people are distinct individuals and not fungible entities, the telecommunications system needs to know which terminal is presently being used by which person, so as to provide proper operation. For example, in the ACD system, the identity of the agent who is presently using a terminal needs to be known so that an accounting system can credit the correct agent with handling the calls that are handled at that terminal. In the security system, the identity of the guard who is presently using the terminal needs to be known to distinguish agents from impostors and to keep track of the guards. In the factory system, the identity of the worker who is presently using a telephone needs to be known to determine whether that worker has privileges to call outside of the factory and to charge the correct worker for long-distance calls. And in the sales office, the identity of a salesperson who is presently using a terminal needs to be known so that incoming calls for salespeople can each be directed either to the proper salesperson's desk if he or she is in the office, and to a voice mail system if he or she is not in the office. In these situations it is also difficult, if not impossible to determine a person's present location, e.g., for receipt of emergency calls, and paging plus callback channels must be used to overcome this lack of knowledge.

In order to keep track of which person is presently using which terminal, advanced telecommunications systems require the person to log on to the telecommunications system from a terminal prior to using the terminal, and require the person to log off when he or she is done using the terminal. Examples of various types of these systems abound in the prior art. Unfortunately, all of them appear to have constraints on the services which they can provide the features which they can support, and the telecommunications equipment which they can adapt to. For example, some require users to have their own terminals and to take these from place to place with them. Others require all terminals in the system to be identical. Some consider a terminal to be vacant (e.g., out-of-service) when no one is logged in at the terminal. Some support only ACD-types of services. Others are suitable only for use with electronic messaging systems. Some treat all users of a terminal the same and are incapable of providing different capabilities and features to different users. And others differentiate between different users only for purposes of one direction, e.g., incoming or outgoing, of call origination.

SUMMARY OF THE INVENTION

This invention is directed to solving these and other disadvantages of the prior art. Generally according to the invention, the inventors have recognized that, in a telecommunications system that uses terminal translations—the attributes that are conventionally associated with the system's individual terminals, such as their characteristics, capabilities, user's identity, permissions, and configurations—for call processing, advantages over the prior art are obtained by (a) dividing the terminal translations into two parts: a terminal-dependent (referred to herein as a physical, part that does not vary with the user of the terminal, and a user-dependent (referred to herein as a logical, part that may vary with the are user of the terminal, (b) permanently associating the physical translations with the corresponding terminals while permanently associating the logical translations with the corresponding users, and (c) temporarily associating each user's logical translations with whichever terminal that user is logged in on at the time. Illustratively, physical translations include attributes such as the terminal type, connected switch port number, and accessories (e.g., display, speakerphone), while logical translations include attributes such as the user's own extension number, display name, coverage path, class of restrictions, class of service, facilities restrictions level, and ACD agent skills.

Specifically according to the invention, use of a plurality of terminals by users—such as use by a user of different ones of the terminals at different times, or shared use of the terminals by a plurality of users—is facilitated in a telecommunications system by (a) associating physical translations, comprising for each terminal those attributes that are independent of the users of the terminal, with the corresponding terminals, and (b) associating logical translations, either comprising for each terminal those attributes that are dependent on the users of the terminal or comprising for each user those attributes thyme are independent of the terminals used by the user, with the corresponding users. Then, in response to a user logging on at one of the terminals, the logical translations that are associated with the logged on user are used, in conjunction with the physical translations that are associated with the one terminal, to perform call processing for telecommunications which involve the one terminal.

Users are thus able to log in on any tern-fiscal and have their logical translations follow them, even if the terminals are not all the same. The physical attributes of the terminals remain with the terminals and do not follow the users. Calls can be placed to the logged in users without knowing which terminals they are using, merely by dialing the users' assigned logical extension numbers, and the calls are automatically muted to the proper terminals at which the individual users are logged in irrespective of what those terminals' physical extension numbers are. Also, calls placed by the logged in users within the system result in the users' own names being reported (e.g., being displayed) at the called terminals, by virtue of the users' logical translations that include their display names following the users from terminal to terminal. The invention is compatible with, and satisfies the requirements of, various kinds of applications, including all those listed as examples in the Background portion of this document. Nor is there a restriction on the services, features, or capabilities in conjunction with which the invention may be used.

Preferably each terminal is administered not only with physical translations, but also with its own set of default terminal translations. Default terminal translations are equivalent attributes to the logical translations. But while the logical translations are associated with logical extension numbers, the default terminal translations are associated with physical extension numbers. When no user is logged in on the terminal, the terminal is fully functional, for purposes of both incoming and outgoing calls, using the assigned physical and default terminal translations for call processing. But when a user is logged in on the terminal, the user's logical translations override the terminal's default terminal translations, and the user's logical translations are used instead of the default terminal translations for processing both outgoing and at least some incoming calls. Therefore, users can make calls from terminals irrespective of whether or not they have logged in at the terminals. And, similarly, calls can be placed to the terminals irrespective of whether or not anyone is logged in at the terminals.

These and other advantages and features of the invention will become apparent from the following description of an illustrative embodiment of the invention considered together with the drawing.

DETAILED DESCRIPTION

Figure 1:
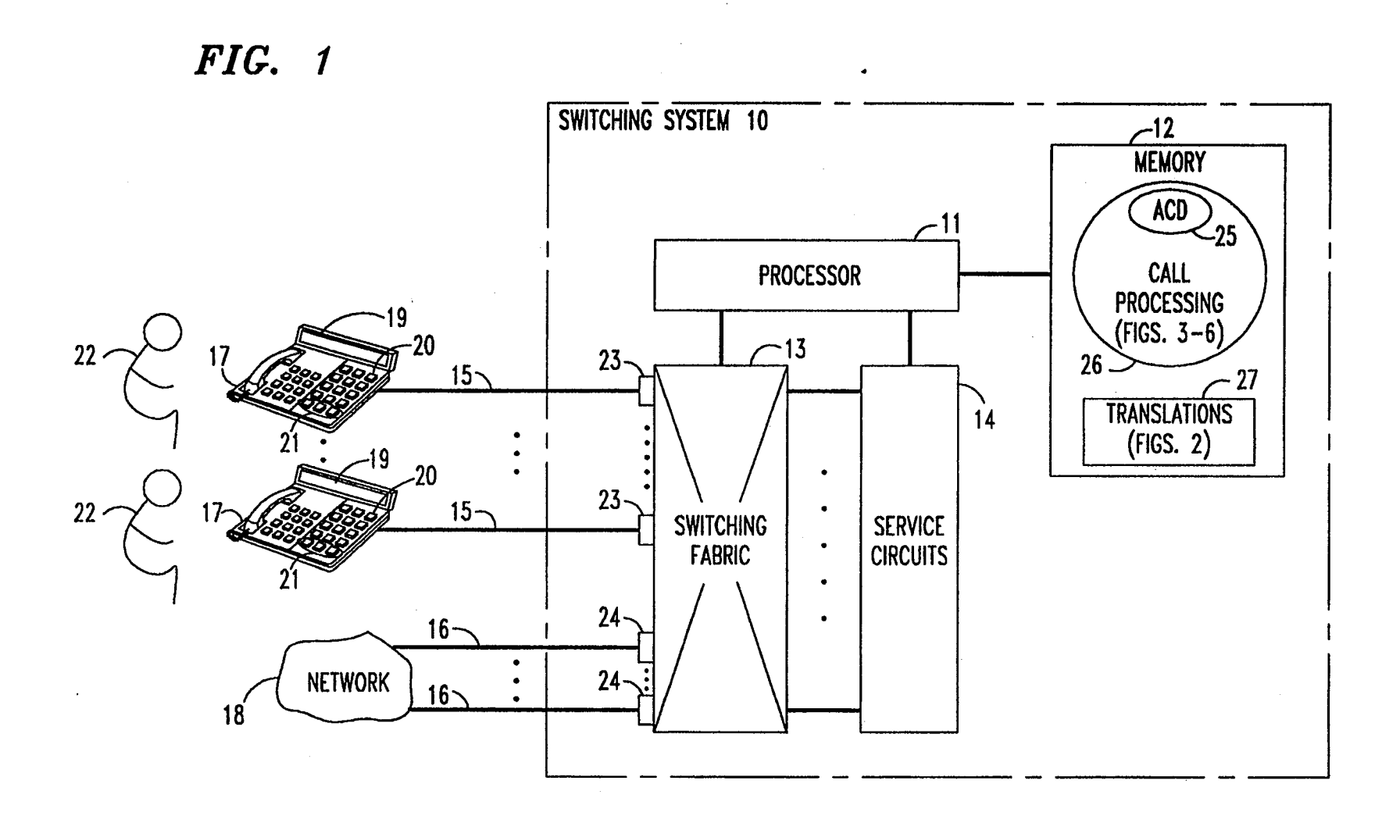
FIG. 1 is a block diagram of an automatic call distribution (ACD) system that includes an illustrative embodiment of the invention.

An illustrative embodiment of the invention is implemented in a telecommunications system shown in FIG. 1. The system of FIG. 1 is illustratively an automatic call distribution (ACD) system that comprises a switching system 10 which provides telephone services to telephone terminals 17, and therethrough to users 22. While terminals 17 can be any voice terminals, in this illustrative example, terminals 17 are ACD terminals and users 22 are ACD agents. Illustratively, all terminals 17 are display telephone sets each having a plurality of line appearances, a display 19, a set of programmable feature buttons 20, of which a selected number are used as ACD work-mode buttons 21 for all agent skills (i.e., for all ACD splits). However, terminals 17 need not all be the same; they may comprise terminals of different types and having different characteristics. Terminals 17 are connected to switching system 10 through ports 23 by telephone lines 15. Switching system 10 interconnects terminals 17 with each other and with the public telephone network, designated in FIG. 1 as network 18, to which the switching system 10 is connected through ports 24 by telephone trunks 16.

Switching system 10 is a stored-program controlled system, such as the AT&T Definity ®Private branch exchange (PBX). It comprises a conventional switching fabric 13, a processor 11 for controlling the operation of fabric 13, and a memory 12 for storing programs for execution and data for use by processor 11 in performing its control functions. Programs stored in memory 12 include call processing 26, which includes an ACD program 25. Data stored in memory 12 include system translations 27 which include terminal translations, both physical and logical as well as default. Switching system 10 further comprises conventional service circuits 14—such as dialed-digit collection devices, outpulsing circuits, tone generators, etc.—also operating under control of processor 11 and connected to fabric 13 for use in setting up call connections and providing call features and other telecommunications services to user terminals 17.

The set of extension numbers served by switching system 10 comprises physical extension numbers which, for purposes of this discussion, may be thought of as being permanently assigned to ports 23 of system 10, and logical extension numbers which are permanently assigned as login user identifiers to ACD agents who are the users 22 of system 10. As terminals 17 are also permanently assigned to ports 23 for purposes of this discussion, the physical extension numbers are effectively permanently assigned to terminals 17. Conversely, the logical extension numbers are administered in system 10 as extensions without any associated port 23 or telephone terminal 17. The full distinction between logical and physical extension numbers is accomplished by administering translations 27 in the manner described below.

Figure 2:
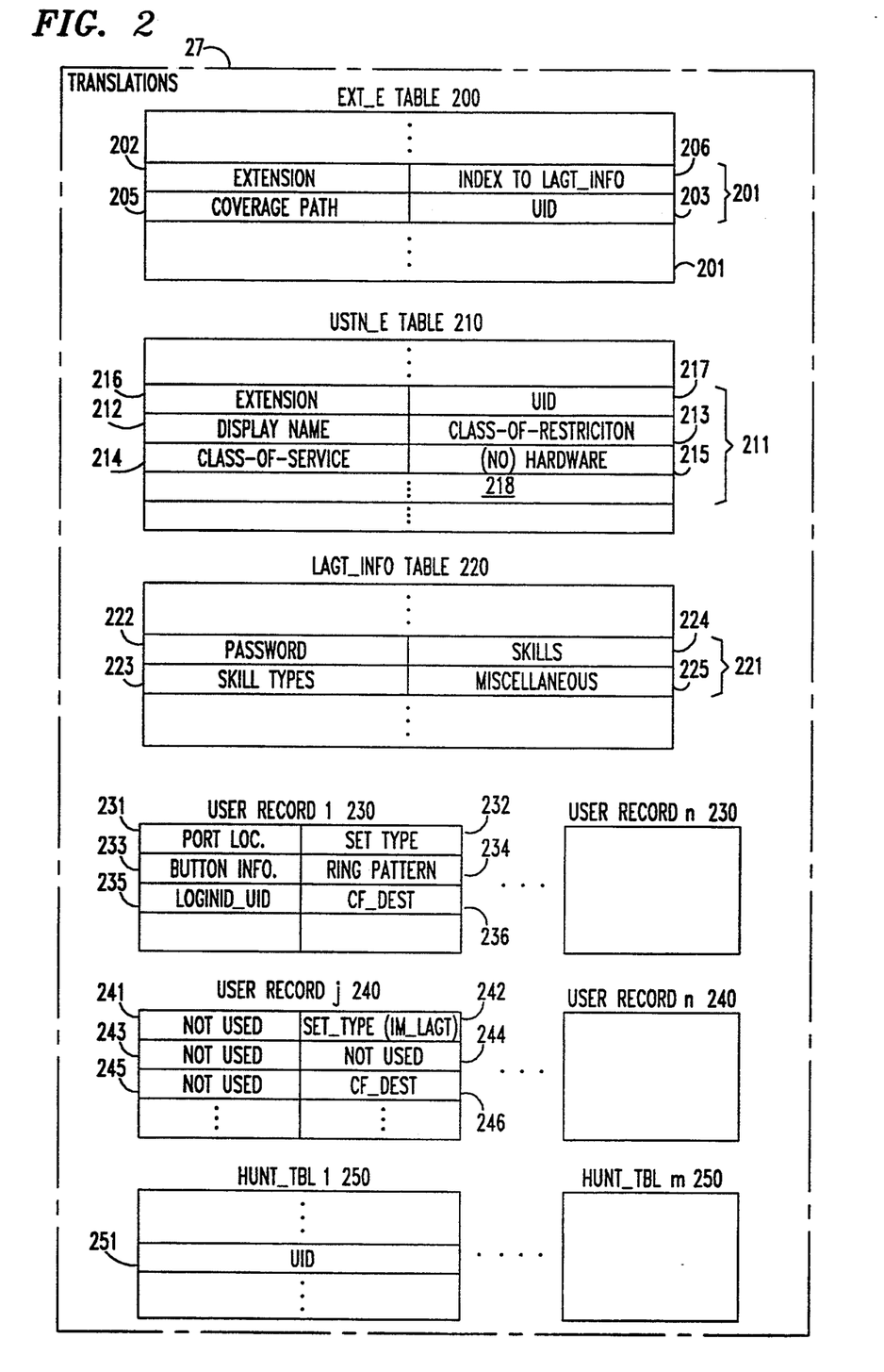
FIG. 2 is a block diagram of selected translations of the ACD system of FIG. 1.

FIG. 2 shows translations 27 that are relevant to this discussion. An extension entry (EXT_E) table 200 is a conventional translations table that includes an entry 201 for each extension number served by system 10. Each entry 201 includes a plurality of administerable fields. Extension field 202 holds the extension number with which entry 201 is associated. User Identifier (UID) field 203 identifies the type of extension number it is: physical/logical, or group (i.e., ACD), and further stores a pointer (UID) to that extension number's corresponding user record 230 or 240. Coverage path field 205 holds the extension number to which should be redirected those calls that are directed to the extension number stored in field 202 but that either cannot be completed or go unanswered. Index to logical agent information (lagt_info) field 206 is a new field whose contents point to a corresponding entry, if any, of a LAGT_INFO table 220. Field 206 is used only in conjunction with logical extension numbers. It contains a pointer if the extension number in field 202 is administered as a logical extension number, and is null otherwise.

A user station entry (USTN_E) table 210 is a conventional translations table that includes an entry 211 for each extension number served by system 10. Each entry 210 includes a plurality of fields. A display name field 212 stores the name of the user with whom the corresponding extension number is associated. Field 212 may be blank if the extension number is not associated with a particular person. It is blank for a group extension number, may be blank for a physical extension number, and is never blank for a logical extension number. Class-of-service field 214 and class-of-restriction field 213 define the services, features, and facilities to which the corresponding extension number is and is not entitled to. Hardware field 215 indicates whether or not there is terminal equipment associated with the corresponding extension number. This field specifics "no hardware" in entries 211 of logical extension numbers. If any of the feature buttons 20 of terminals 17 are administered, this field in physical extension numbers' entries 211 specifies which feature corresponds to which button 20. Extension field 216 and UID field 217 of an entry 211 are equivalents of extension field 202 and UID field 203, respectively, of entries 201 of EXT_E table 200. Entries 211 further contain other conventional information fields 218 that are not relevant to this discussion.

A LAGT_INFO table 220 is a new translations table that includes an entry 221 for each logical extension number, i.e., for each agent. Each entry 221 includes a plurality of fields. Password field 222 holds a password assigned to the corresponding agent. Skills field 224 lists all the skills (e.g., language fluency) that the corresponding agent possesses, while skill types field 223 indicates which ones of the agent's skills are primary, i.e., skills in which that agent is most proficient. Skills which are not indicated to be primary are considered to be secondary. Miscellaneous field 225 lists other optional information that is associated with the agent, such as whether a logical extension is used with a voice-mail system.

Translations 27 further include a plurality of user records 230 and 240, one for each extension number served by system 10. User records 230 and 240 are conventional data structures, but some of their contents differ from the conventional. The contents also differ between user records 230 of physical extension numbers and user records 240 of logical extension numbers. A user record 230 contains a plurality of fields 231–236. Port (loc) field 231 identifies port 23 of switching system 10 to which the corresponding extension number is assigned. Set type field 232 defines the type of terminal 17 that is connected to the port 23 identified in field 231. Button information (info) field 233 defines the present state (e.g., activated or not activated) of buttons 20 and 21 of terminal 17 that is connected to this port 23. Ring pattern field 234 defines the audible type of ringing heard when the corresponding terminal 17 is called. login identifier user identifier (LOGINID_UID) field 235 stores the UID of the logical extension number of an agent (if any) who is logged in at the corresponding terminal 17. And call-forwarding destination (CD_DEST) field 236 holds the extension number of a forwarded-to terminal, if the call-forwarding feature has been activated for this record's extension, and is blank otherwise.

A user record 240 of a logical extension number is structured like a record 230, with fields 241–246 that correspond to fields 231–236 of user record 230 of a physical extension number. But fields 241 and 243–245 are not used, and fields 242 and 246 hold different information than fields 232 and 236. Set type field 242 holds an "I am a" logical agent (IM_LAGT) value which identifies this record as a user record of a logical extension number, and CF_DEST field 246 holds the physical extension number of the terminal 17, if any, at which the agent 22 who owns the record's corresponding logical extension number is presently logged in.

System translations 27 further include conventional hunt group tables (HUNT_TBL) 250, up to a predetermined number of which may be administered as skill hunt groups, one for each agent skill that exists in the ACD arrangement implemented by system 10. For purposes of this application, an agent skill is used as an ACD split identifier. Skill hunt groups do not have any agent-related data pre-administered into them. Rather, agents become dynamically associated with one or more skill hunt groups upon logging in. When an agent 22 logs in at a terminal 17, that terminal's UID (contents of field 203 of that terminal's corresponding entry 201 of table 200) is entered into entries 251 of all tables 250 that correspond to the skills listed in field 224 of that agent's corresponding record 221 of table 220.

The data structures of FIG. 2 are used by call processing in the manner described below.

When a user 22 wishes to become available to the ACD system as an ACD agent, he or she logs in at any one of the terminals 17. The user begins by dialing a login feature access code (FAC). The dialed digits are conventionally collected and passed to call processing for analysis. Call processing analyzes the digits in a conventional manner. When it recognizes the FAC as a login request, call processing invokes an agent login feature module, which is flowcharted in FIG. 3.

Figure 3:
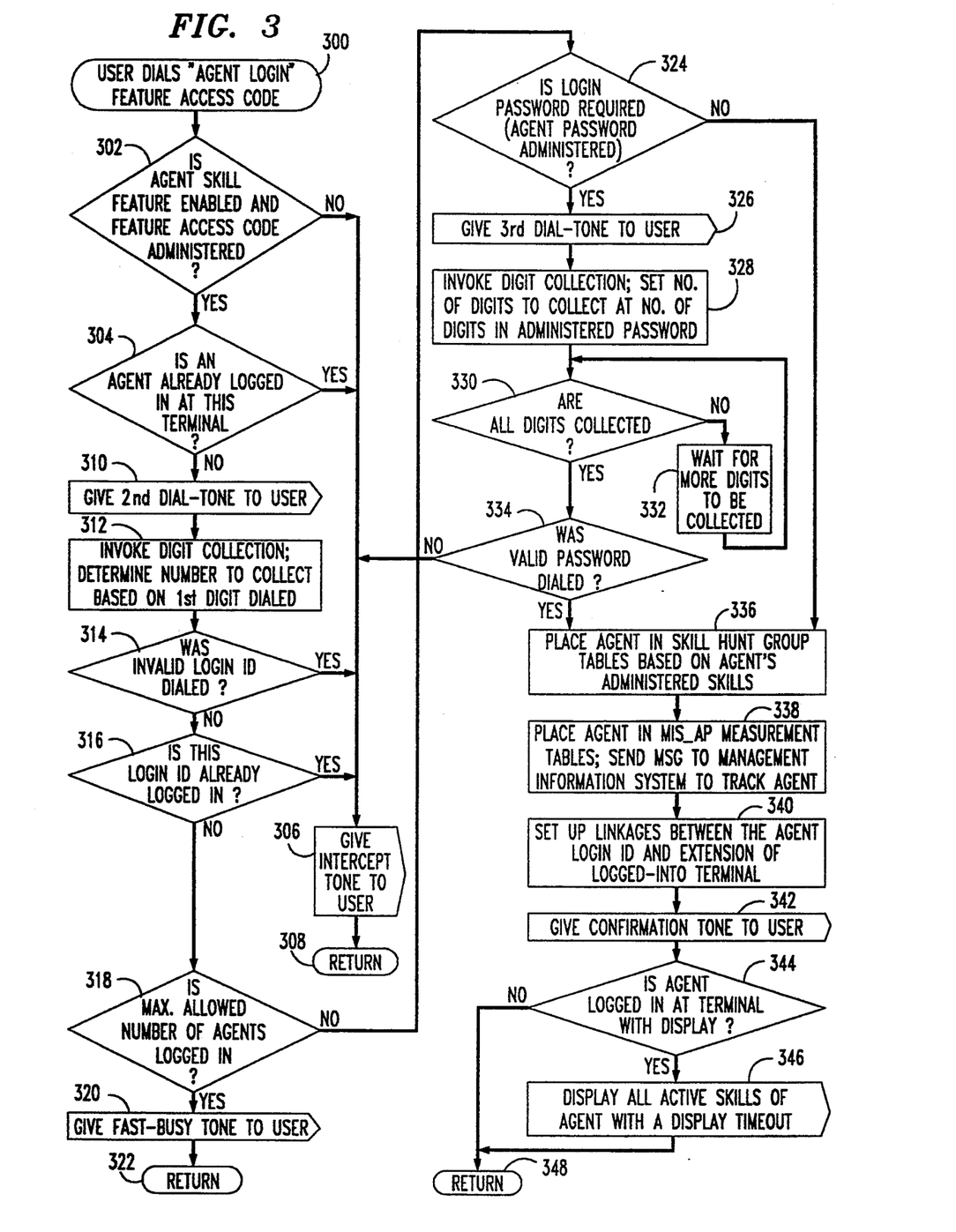
FIG. 3 is a flow diagram of an agent login feature module of the call processing of the ACD system of FIG. 1.

Upon its invocation, at step 300, the login module checks whether the agent skill feature has been enabled, and whether the FAC has been administered, on this system 10, at step 302. Illustratively, the feature module performs the first check by checking a status of a flag in a conventional customer-options record (not shown) of system translations 27, and performs the second check by examining a list of administered codes in a conventional feature access code record (not shown) of translations 27. If the agent skill feature is not enabled or the FAC is not administered, the login module causes intercept tone to be given to the user 22, at step 306, in a conventional manner, and then returns to the point of its invocation, at step 308. If the feature is enabled and the code is administered, the login module checks whether another agent 22 has already logged in at this terminal 17, at step 304. The login module performs this check by using the identity of port 23 at which the user is logging in as a pointer into EXT_E table 200 to find therein the corresponding entry 201, determining from field 202 the corresponding extension number, and then checking that extension number's user record 230 to determine if field 235 thereof is blank. If it is not blank, it means that someone is already logged in at that terminal 17, and login module proceeds to steps 306 et seq. to give intercept treatment to the user 22.

If it is determined at step 304 that no agent 22 is logged in at this terminal 17, the login module causes a second dial tone to be given to the user 22, at step 310. This serves as a prompt to the user to dial his or her login ID, which is the user's assigned logical extension number. The login module then invokes conventional digit collection, and from the first dialed collected digit determines the number of digits that need to be collected, at step 312, in a conventional manner. When the determined number of digits has been collected, login module checks whether the dialed login ID is valid, at step 314. Login module performs this check by using the dialed login ID as a pointer into EXT_E table 200 to determine if there is an entry 201 that has this number in extension field 202, and if so, if its index to lagt_info field 206 indicates that it is a logical extension number. If no extension field 202 holds this number, or if an extension field 202 holds this number but the corresponding field 206 does not identify it as a logical extension number, the dialed login ID is not a valid logical extension number and hence is an invalid login ID, and the login module responds by proceeding to steps 306 et seq. to give the user 22 intercept treatment.

If the dialed login ID is found to be valid at step 314, the login module checks whether the user 22 who owns this login ID has already logged in, at step 316. The login module performs this step by accessing user record 240 which corresponds to the login ID, and checking whether field 246 thereof is empty. If field 246 is not empty, the user 22 who owns this login ID is already logged in, and the login module responds by proceeding to steps 306 et seq. to give the user intercept treatment.

If the user 22 who owns the dialed login ID is found at step 316 to not be logged in, the login module checks whether the maximum allowed number of agents is already logged in, at step 318. The system keeps a running count of how many agents are logged in, and it compares this count against a predetermined number. If the count meets or exceeds the predetermined number, the maximum allowed number of agents is already logged in, and the login module responds by causing a fast-busy tone to be given to the user 22, at step 320. The login module then returns, at step 322.

If it is determined at step 3 18 that the maximum allowed number of agents is not logged in, the login module checks whether a login password is required and whether a password is administered for this agent 22, at step 324. The login module performs this check by using the dialed login ID extension to retrieve the corresponding pointer into LAGT_INFO table 220 to find therein the agent's corresponding entry 221 and checking password field 222 of that entry 221 to determine if it is empty. If a password is not administered for this agent (field 222 is empty), a password is not required, and login module proceeds to steps 336 et seq., otherwise, login module proceeds to steps 326 et seq.

At step 326, login module causes a third dial tone to be given to the user 22, in a conventional manner. The login module then invokes conventional digit collection to collect a number of digits corresponding to the number of digits in the administered password, at step 328, in a conventional manner. For each digit collected, the login module checks whether the required number of digits has been collected, at step 330. If not, the login module waits for more digits to be collected, at step 332, and repeats step 330; if so, the login module proceeds to step 334 to check whether the dialed password is valid for the agent. The login module performs the check at step 334 by comparing the received dialed password against contents of password field 222 of entry 221 of LAGT_IINFO table 220 which it accessed at step 324. If the dialed password is invalid, the login module proceeds to steps 306 et seq. to give the user intercept treatment. If the password is valid, the user 22 has successfully logged in as an agent, and the login module proceeds to steps 336 et seq.

At step 336, the login module places the agent 22 in skill hunt group tables 250 that correspond to skills that are administered for the agent. The login module performs this task by: retrieving contents of skills field 224 of LAGT_INFO table 220 entry 221 which it accessed at step 324, in order to determine the skills that are administered for this agent 22; retrieving contents of UID field 203 of entry 201 of EXT_E table 200 which it accessed at step 304; and entering the retrieved contents in a UID entry 251 of all hunt tables 250 which correspond to the administered skills retrieved from skills field 224. The login module then enters the agent's logical extension number in conventional management information system application (MIS_AP) measurement tables (not shown) in translations 27, and sends a message to a conventional management information system (not shown) to cause it to keep track of the agent's activities, at step 338. The login module then sets up linkages between the agent's login ID and the physical extension number of terminal 17 at which the agent 22 is logged in, at step 340. The login module performs this function by: entering into LOGINID_UID field 235 of user record 230 the UID from field 203 of the agent's login ID's corresponding entry 201 in table 200; using this UID as a pointer to the agent's login ID's corresponding user record 240; and entering into CF_DEST field 246 of this user record 240 the physical extension number of terminal 17 at which the agent 22 has logged in.

After setting up the linkages at step 340, the login module causes a confirmation tone to be given to the agent 22, at step 342, and checks whether terminal 17 at which the agent is logged in has a display 19, at step 344. The login module performs the check by examining the contents of set type field 232 of user record 230 that corresponds to the physical extension number of terminal 17 at which the agent logged in. If terminal 17 is determined at step 344 to have a display 19, the login module causes a list of the skills which are active for the agent to be displayed for a predetermined period of time on display 19 of that terminal 17, at step 346. The login module does this by keeping track of which skill hunt groups 250 the agent was successfully entered into and causing the skills that correspond to these hunt groups 250 to be displayed. Following step 346, or if terminal 17 is determined at step 344 to not have a display 19, the tasks of the login module are completed, and it returns, at step 348.

A user 22 need not be logged in at a terminal in order to make calls therefrom. When any user 22 wishes to place a call from a terminal 17, he or she goes off-hook and dials the called telephone number, in a conventional manner. The dialed digits are collected and analyzed by call processing, again conventionally. When call processing determines that a telephone number (e.g., a number other than an agent login or logout code) has been dialed, it invokes the routine of FIG. 4.

Figure 4:
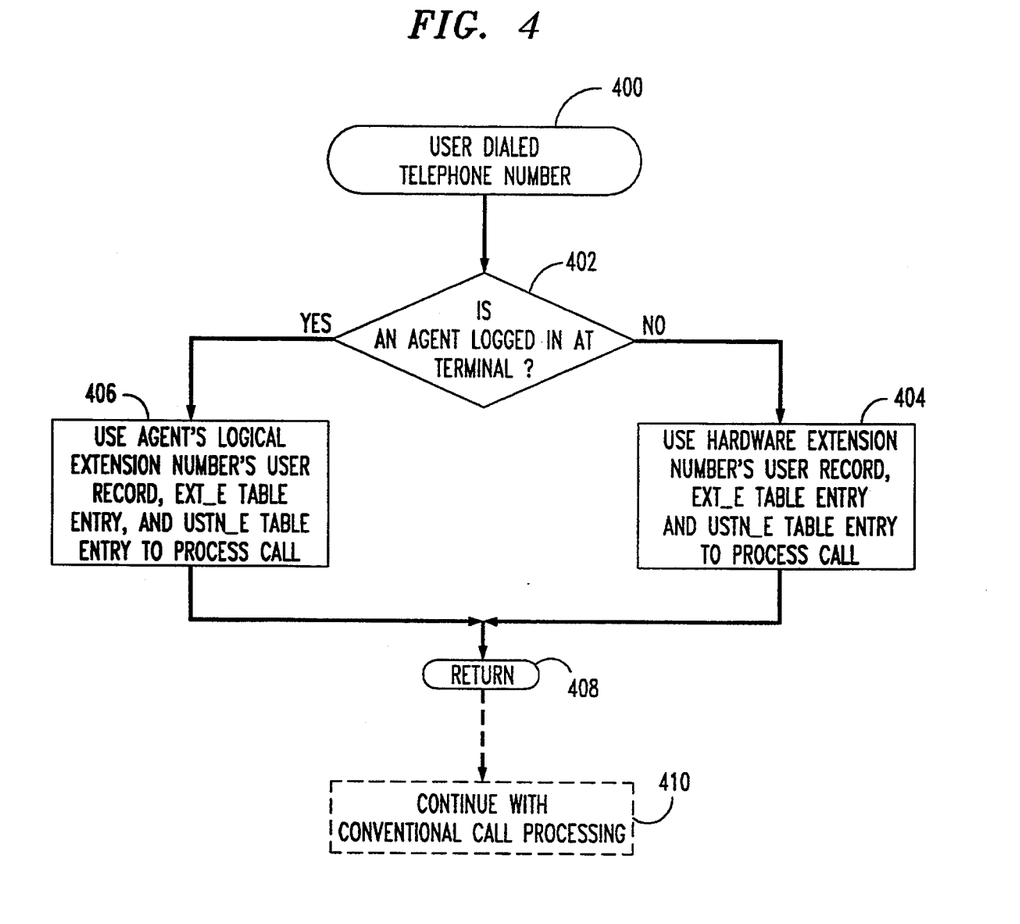
FIG. 4 is a flow diagram of an outgoing call processing routine of the call processing of the ACD system of FIG. 1.

Upon its invocation, at step 400, the routine checks whether an agent 22 is logged in at the calling terminal 17, at step 402. It performs this function by: accessing entry 235 of user record 230 which corresponds to port 23 of system 10 at which the call is being originated, and checking whether the accessed LOGINID_UID field 235 is empty. If it is empty, no agent 22 is logged in at the calling terminal 17, and the routine causes conventional call processing to use that user record 230, and USTN_E table 210 entry 211 which corresponds to the physical extension number, to process the call, at step 404, illustratively by identifying the physical extension number of the calling port 23 to conventional call processing as the calling number. Inter alia, this will result in the contents of field 212 of entry 211 which corresponds to the calling physical extension number being displayed on display 19 of the called terminal 17. If field 235 of the accessed record 230 is not empty, an agent 22 is logged in at the calling terminal 17, and the routine causes conventional call processing to use that agent's corresponding user record 240 and USTN_E table 210 entry 211 to process the call, at step 406. The routine does this by: comparing the non-empty contents of LOGINID_UID field 235 against contents of UID field 203 of entries 201 of table 200 to find matching contents; accessing field 202 of entry 201 which has the matching UID field 203 to obtain therefrom the logical extension number that corresponds to the logged-in agent 22; and identifying this logical extension number to conventional call processing as the calling number. This logical extension number's corresponding entry 211 in table 210 is used to identify the calling user's name (stored in field 212) and to display this name on display 19 of the called terminal 17. The routine then returns, at step 408, whereupon conventional call processing continues, at step 410.

To place calls to terminals 17 served by system 10, physical, logical, and group extension numbers may be used as the called numbers. If the called number is a group extension number, the call is directed by ACD 25 to the terminal 17 of any agent 22 registered in that hunt group who is available to handle that call, in a conventional manner. If the called number is a physical extension number, the call is directed to whichever port 23 is assigned that extension number, also in a conventional manner, and contents of field 212 of USTN_E table 210 entry 211 which corresponds to the called physical extension number are displayed on display 19 of the calling terminal. If the call cannot be answered at the destination port 23, it is redirected to the call-coverage path specified by field 205 of EXT_E table 200 entry 201 of the called physical extension number. But if the called number is a logical extension number, the call is directed to whichever port 23—if any—the agent 22 who owns that logical extension number is logged in at, and contents of field 212 of USTN_E table 210 entry 211 which corresponds to the called logical extension number are displayed on display 19 of the calling terminal 17. If the agent 22 who owns the logical extension number is not logged in or if the call cannot be answered at the destination port 23, it is redirected to the call-coverage path specified by field 205 of EXT_E table 200 entry 201 of the called logical extension number.

Figure 5:
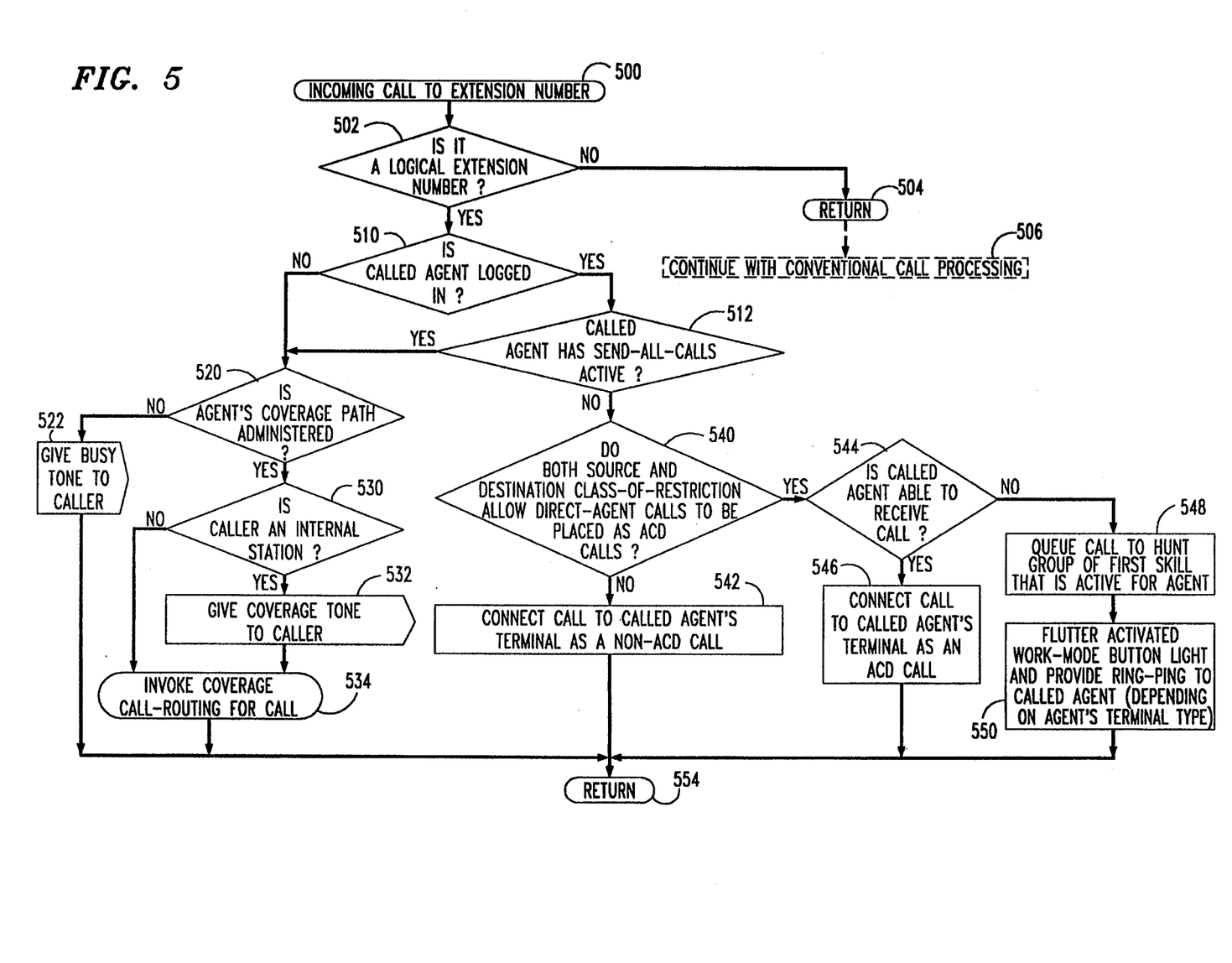
FIG. 5 is a flow diagram of an incoming call processing routine of the call processing of the ACD system of FIG. 1.

In response to conventional detection of an incoming call, call processing invokes the routine of FIG. 5. In response to its invocation, at step 500, the routine determines if the called extension number is a logical extension number, at step 502. This determination is made by accessing entry 201 of EXT_E table 200 which corresponds to the called number and checking contents of field 206 thereof. If field 206 contains a null value, the corresponding extension number is a physical extension number, and so the routine merely returns, at step 504, to conventional call processing, which then processes the call in a conventional manner, at step 506.

If field 206 contains a pointer to an entry 221 of table 220, the corresponding extension number is a logical extension number, and so the routine first checks whether the called agent 22 is logged in, at step 510. This involves accessing user record 240 of the called logical extension number and checking CF_DEST field 246 thereof. If field 246 is empty, the agent 22 is not logged in, and the call cannot be completed to the agent. The routine therefore checks coverage path field 205 of EXT_E table 200 entry 201 which corresponds to the called extension number, to determine whether the called agent's coverage path is administered, at step 520. If field 204 is empty, the coverage path is not administered and the call cannot be completed at all, and so the routine causes a busy tone to be returned to the call source, at step 522, and then returns, at step 554.

If the called agent's coverage path is found to be administered at step 520, the routine checks, at step 530, whether the call source is a terminal 17 or a trunk 16. If it is a terminal 17, the routine causes a coverage tone to be sent to the caller, at step 532. Following step 532, or if the call source is a trunk 16, the routine invokes a standard coverage call-routing function (not shown) for this call, at step 534. The function then returns, at step 554.

Returning to step 510, if it is there determined that the called agent 22 is logged in, the routine checks whether the called agent has activated the send-all-calls feature on the terminal 17 at which the called agent is logged in, at step 512. The routine performs this check by retrieving the physical extension number of that terminal 17 from field 246 of user record 240 of the called logical extension number, and then examining contents of button info field 233 of user record 230 of that retrieved physical extension number. If the called agent 22 has activated the send-all-calls feature, the call cannot be completed to the agent, and so the routine proceeds to steps 520 et seq., discussed above. If the called agent 22 has not activated the send-all-calls feature, the routine checks whether the classes-of restrictions of the call source and call destination allow direct-agent calls (calls using an agent's login ID as the called number) to be placed as ACD calls, at step 540. The routine does this as follows. If the call source is a trunk 15, the routine accesses conventional trunk translations (not shown) for that trunk 15 in translations 27 to determine if the trunk's class of restrictions permits direct-agent calls to be placed as ACD calls. If the call source is a terminal 17, the routine accesses user record 230 of that terminal's physical extension number to determine from LOGINID_UID field 235 thereof if an agent 22 is logged into the calling terminal 17. If no agent 22 is logged in (i.e., field 235 is empty), the routine accesses the physical extension number's corresponding entry 211 in USTN_E table and uses contents of field 213 thereof to determine whether direct-agent calls are permitted to be placed as ACD calls. If an agent 22 is logged in at calling terminal 17, the routine uses the contents of LOGINID_UID field 235 of the accessed user record 230 to determine the logical extension number of the logged in agent 22, and then accesses the logical extension number's corresponding entry 211 in USTN_E table 210 to determine from field 213 thereof whether direct-agent calls are permitted to be placed as ACD calls. The routine also accesses the called extension number's corresponding entry 211 in USTN_E table 210 to determine from field 213 thereof whether direct-agent calls are permitted to be placed as ACD calls. If direct-agent calls are not permitted to be placed as ACD calls for either the call source or the call destination, the routine causes the call to be connected to an idle line appearance of the agent's terminal 17, at step 542, as a non-ACD call (e.g., a personal call), in a standard manner. The routine then returns, at step 554.

If it is determined at step 540 that direct-agent calls are permitted to be placed as ACD calls for both the call source and the call destination, the routine checks whether the called agent 22 is able to receive the call, at step 544. This involves checking conventional system status flags (not shown) to determine the state of the agent. If the state of the agent indicates that the call can be received by the agent 22 immediately, the routine causes the call to be connected to an idle line appearance of the agent's terminal 17 as an ACD call, at step 546, in a standard manner. This involves activating of call-reporting about this call to the measurement information system. The routine then returns, at step 554.

If it is determined at step 544 that the called agent 22 is not able to receive the call now, the routine places the call in the hunt group queue (not shown) of the first skill that is active for the agent, at step 548. This involves accessing EXT_E table 200 entry 201 which corresponds to the called logical extension number to determine from field 206 thereof which entry 211 of LAGT_INFO table 210 corresponds to the agent 22, and then accessing that entry 211 to determine from field 224 thereof the first skill listed therein. The call is then entered in the hunt group queue of that skill, along with the UID of the physical extension number of the terminal 17 to which the call is directed, in a conventional manner for direct-agent calls. The routine then causes the presently-activated work-mode button light (not shown) of the agent's terminal 17 to flutter (to light in a rapid on-off sequence) and a ring-ping (a quick burst of ringing) to be given at the agent's terminal 17, at step 550, in a conventional manner for direct-agent calls. The routine then returns, at step 554. When the agent 22 becomes available to receive the call, the call is connected to an idle line appearance of the agent's terminal 17 on a priority basis over standard ACD calls, as is conventional for queued direct-agent calls.

Figure 6:
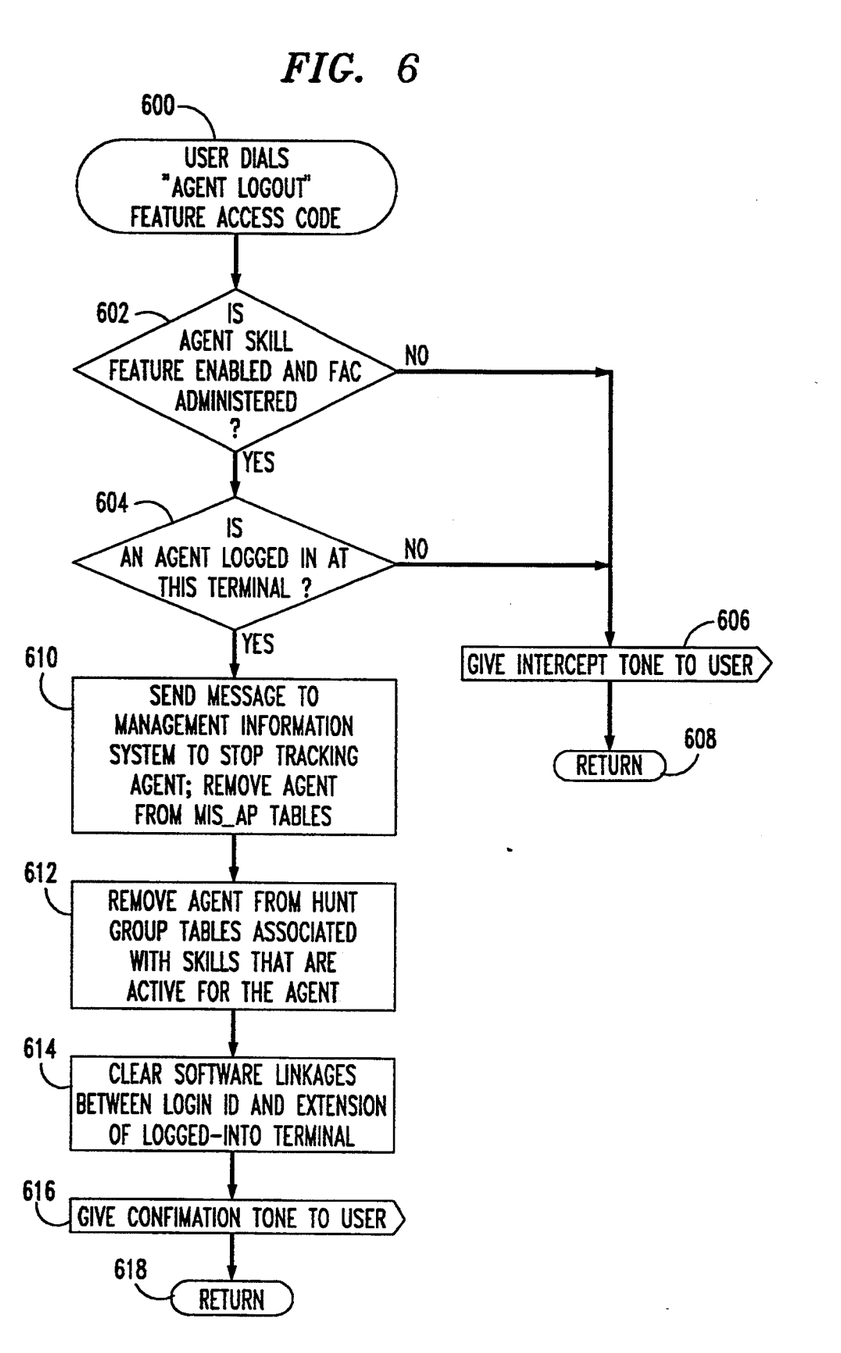
FIG. 6 is a flow diagram of an agent logoff feature module of the call processing of the ACD system of FIG. 1.

FIG. 6 flowcharts the feature module that is invoked when an agent 22 logs off of a terminal 17. The agent 22 begins by dialing a logoff feature access code (FAC). The dialed digits are conventionally collected and passed to call processing for analysis. Call processing analyzes the digits in a conventional manner. When it recognized the FAC as a logoff request, call processing invokes the agent logoff feature module of FIG. 6.

Upon its invocation, at step 600, the logoff module checks whether the agent skill feature has been enabled and whether the FAC has been administered on this system 10, at step 602. This step duplicates step 302 of FIG. 3. If the feature is not enabled or the code has not been administered, the, logoff module causes intercept tone to be given to the agent 22, at step 606, in a conventional manner, and then returns, at step 608. If the feature is enabled and the code is administered, the logoff module checks whether any agent is logged in at this terminal, at step 604. The logoff module performs this check by using user record 230 of port 23 at which the agent 22 is logging off to determine if the LOGINID_UID field 235 is set to some (non-null) value. If it is null, no-one is logged in at this terminal 17, and so the logoff module proceeds to steps 606 et seq. to indicate denial of the logoff request to the agent 22.

If it is determined at step 604 that an agent 22 is logged in at this terminal, the logoff module sends a message to the conventional management information system (not show), discussed previously, to cause it to cease tracking this agent's activities, and removes the agent's logical extension number from the conventional MIS_AP measurement tables (not shown), discussed previously, at step 610. The logoff module obtains the agent's identity, i.e., his or her logical extension number, from LOGINID_UID field 235 of user record 230 of the physical extension number of port 23 on which the logoff request has been received. The logoff module then removes the identified agent 22 from skill hunt group tables 250 that correspond to skills that are active for the agent, at step 612. The logoff module performs this task by: retrieving contents of field 235 of user record 230 of port 23 on which the logoff request has been received, to identify the agent's corresponding entry 201 in EXT_E table 200; retrieving contents of field 206 of the identified entry 201 in order to identify the agent's corresponding entry 211 of LAGT_INFO table 220; retrieving contents of field 224 of the identified entry 211 to determine the skills that are administered for this agent 22; searching hunt tables 250 which correspond to those skills for entries 251 that store the agent's physical extension's corresponding UID; and clearing those entries 251. The logoff module then clears the linkages between the agent's login ID and the physical extension number of terminal 17 at which the agent 22 is logging off, at step 614. This step is a reverse of step 340 of FIG. 3, and is performed by: clearing field 235 of user record 230 of that port's extension number; and clearing field 246 of user record 240 that corresponds to the agent's logical extension number. Then, at step 616, the logoff routine causes a confirmation tone to be given to the agent 22, and returns, at step 618.

Of course, it should be understood that various changes and modifications to the illustrative embodiment described above will be apparent to those skilled in the art. For example, the telecommunications system of FIG. 1 need not be a telephony ACD system but may be any desired telecommunications system. Or, any telecommunications attributes (e.g., restriction levels, calling privileges, account codes) may be allocated by system administrators to one or the other of physical and logical translations. Also, users may have their logical attributes recorded on a "smart card", which they can plug into a terminal in order to log in thereon and at the same time program the system with their logical attributes. Such changes and modifications can be made without departing from the spirit and the scope of the invention and without diminishing its attendant advantages. It is therefore intended that all such changes and modifications be covered by the following claims.

We claim:

1. In a telecommunications system that includes a plurality of user terminals and terminal translations that define attributes of the individual terminals, a method of facilitating use of the individual terminals by a plurality of different users, comprising the steps of:
    associating physical translations, comprising for each terminal those terminal translations that are independent of users of the terminal, with the corresponding terminals;
    associating logical translations, comprising for each terminal those terminal translations that are dependent on the users of the terminal, with the corresponding users, some of the users having different associated logical translations than others of the users;

logging on any one of the users at any one of the terminals; and in response to the logging on, using the physical translations associated with the one terminal and the logical translations associated with the one logged on user to perform call processing for telecommunications which involve the one terminal.

2. The method of claim 1 wherein:

the step of associating logical translations comprises the step of associating logical translations, comprising for each user those attributes that are independent of the terminals used by the user, with the corresponding users, some of the users having different associated logical translations than others of the users.

3. The method of claim 2 wherein:

the logical translations associated with a user define a call-coverage path for the corresponding user, and some of the users have different defined call-coverage paths than others of the users; and the step of using comprises the step of redirecting a telecommunication that is unable to be received by the one user to the call-coverage path defined by the logical translations associated with the one user.

4. The method of claim 1 wherein:

the step of associating physical translations comprises the step of permanently associating the physical translations with the corresponding terminals;

the step of associating logical translations comprises the step of permanently associating the logical translations with the corresponding users, some of the users having different permanently associated logical translations than others of the users;

the step of logging on comprises the step of in response to the logging on of the one user, temporarily associating the one user's logical translations with the one terminal; and the step of using comprises the step of using the physical translations permanently associated with the one terminal and the logical translations temporarily associated with the one terminal to perform call processing for telecommunications which involve the one terminal.

5. The method of claim 4 further comprising the steps of:

logging off the one user at the one terminal; and in response to the logging off, disassociating the logical translations of the one user from the one terminal.

6. In a telecommunications system that includes a plurality of ports for interfacing user terminals to the system and terminal translations that define attributes that are assigned to corresponding ports, a method of facilitating use of the individual ports a by plurality of different users, comprising the steps of:

associating physical translations, comprising for each port those terminal translations that are independent of users of the terminal which is interfaced by the port, with the corresponding ports;

associating logical translations, comprising for each port those terminal translations that are dependent on the users of the terminal which is interfaced by the port, with the corresponding users, some of the users having different associated logical translations than others of the users;

logging on any one of the users at the terminal which is interfaced by any one of the ports; and in response to the logging on, using the physical translations associated with the one port and the logical translations associated with the one logged on user to perform call processing for telecommunications which involve the one port.

7. In a telecommunications system that includes a plurality of user terminals, terminal translations that define attributes of the individual terminals, and call processing that uses terminal translations associated with an individual terminal to process telecommunications involving the individual terminal, a method of facilitating use of the individual terminals by a plurality of different users, comprising the steps of:

permanently associating physical translations, comprising for each terminal those terminal translations that are independent of users of the terminal, with the corresponding terminals;

permanently associating default terminal translations, comprising for each terminal those terminal translations that are dependent on the users of the terminal, with the corresponding terminals;

associating logical translations, comprising for each user those terminal translations that are independent of the terminals used by the user, with corresponding users, some of the users having different associated logical translations than others of the users; and in response to any one of the users logging on at any one of the terminals, temporarily associating the one user's logical translations with the one terminal.

8. The method of claim 7 further comprising the step of:

in response to a telecommunication involving the one terminal, using the physical and only one of the logical and the default terminal translations that are associated with the one terminal to perform call processing for the telecommunication.

9. The method of claim 7 further comprising the step of:

in response to the one user logging off at the one terminal, disassociating the one user's logical translations from the one terminal.

10. In a telecommunications system that includes a plurality of user terminals and terminal translations that define attributes of the individual terminals, a method of facilitating use of the individual terminals by a plurality of different users, comprising the steps of:

associating physical translations, comprising for each terminal those terminal translations that are independent of users of the terminal, with the corresponding terminals, some of the terminals having different associated physical translations than others of the terminals;

associating logical translations, comprising for each user those terminal translations that are independent of the terminals used by the user, with the corresponding users, some of the users having different associated logical translations than others of the users;

logging on any one of the users at any one of the terminals; and in response to the logging on, using the physical translations associated with the one terminal and the logical translations associated with the one logged on user to perform call processing for telecommunications which involve the one terminal.

11. The method of claim 10 wherein:

the logical translations associated with a user define a call-coverage path for the corresponding user, and some of the users have different defined call-coverage paths than others of the users; and the step of using comprises the step of redirecting a telecommunication that is unable to be received by the one user to the call-coverage path defined by the logical translations associated with the one user.

12. The method of claim 10 wherein:

the step of associating physical translations comprises the step of permanently associating the physical translations with the corresponding terminals;

the step of associating the logical translations comprises the step of permanently associating the logical translations with the corresponding users, some of the users having different permanently associated logical translations than others of the users;

the step of logging on comprises the step of in response to the logging on of the one user, temporarily associating the one user's logical translations with the one terminal; and the step of using comprises the step of using the physical and logical translations that are presently associated with the one terminal to perform call processing for telecommunications which involve the one terminal.

13. The method of claim 10 wherein:

the step of associating logical translations comprises the steps of associating each terminal's default terminal translations, comprising for each terminal those terminal translations that are dependent on the users of the terminal, with the corresponding terminals, and associating each user's logical translations, comprising for each user those terminal translations that are independent of the terminals used by the user, with the corresponding users; and the method further comprises the step of in an absence of one of the users being logged on at the one terminal, using the physical translations associated with the one terminal and the default terminal translations associated with the one terminal to perform call processing for telecommunications which involve the one terminal.

14. The method of claim 13 wherein:

the step of using in response to the logging on comprises the step of using the physical translations associated with the one terminal and the logical translations associated with the one logged on user to perform call processing for telecommunications originating at the one terminal: and the step of using in an absence of one of the users being logged on at the one terminal comprises the step of using the physical translations associated with the one terminal and the default terminal translations associated with the one terminal to perform call processing for telecommunications originating at the one terminal.

15. The method of claim 10 wherein:

the step of associating physical translations comprises the step of associating each terminal's physical translations, comprising for each terminal those terminal translations that are independent of the users of the terminal and including a physical extension number, with the corresponding terminals;

the step of associating logical translations comprises the step of associating each terminal's default terminal translations, comprising for each terminal those terminal translations that are dependent on the users of the terminal, with the corresponding terminals, and associating each user's logical translations, comprising for each user those terminal translations that are independent of the terminals used by the user and including a logical extension number, with the corresponding users, at least some of the users having different logical extension numbers than others of the users;

the step of using comprises the steps of using the physical translations associated with the one terminal and the logical translations associated with the one logged on user to perform call processing for telecommunications originating at the one terminal, and using the physical translations associated with the one terminal and the logical translations associated with the one logged on user to perform call processing for telecommunications addressed to the logical extension number of the one user; and the method further comprises the steps of in an absence of one of the users being logged on at the one terminal, using the physical and the default terminal translations associated with the one terminal to perform call processing for telecommunications originating at the one terminal, and using the physical and the default terminal translations associated with the one terminal to perform call processing for telecommunications addressed to the physical extension number of the one terminal.

16. The method of claim 15 wherein:

the logical translations associated with a user define a call-coverage path for the corresponding user, and some of the users have different defined call-coverage paths than others of the users; and the method further comprising the step of redirecting telecommunications addressed to the logical extension number of the one user to the call-coverage path defined by the logical translations associated with the one user, in an absence of the one user being logged on at one of the terminals.

17. The method of claim 15 wherein:

the default terminal translations associated with a terminal define a call-coverage path for the corresponding terminal;

the logical translations associated with a user define a call-coverage path for the corresponding user, and some of the users have different defined call-coverage paths than others of the users;

the step of using for telecommunications addressed to the logical extension number of the one user comprises the step of redirecting a telecommunication addressed to the logical extension of the one logged on user to the call-coverage path defined by the logical translations associated with the one user, when the telecommunication is unable to be received at the one terminal;

the step of using for telecommunication addressed to the physical extension number of the one terminal comprises the step of redirecting a telecommunication addressed to the physical extension of the one terminal to the call-coverage path defined by the default terminal translations associated with the one terminal when the telecommunication is unable to be received at the one terminal; and the method further comprises the step of redirecting a telecommunication addressed to the logical extension number of the one user to the call-coverage path defined by the logical translations associated with the one user, in an absence of the one user being logged on at one of the terminals.

18. An arrangement for facilitating use of individual user terminals by a plurality of different users in a telecommunications system that includes a plurality of the terminals and terminal translations that define attributes of the individual terminals, comprising:

means for associating physical translations, comprising for each terminal those terminal translations that are independent of users of the terminal, with the corresponding terminals;

means for associating logical translations, comprising for each terminal those terminal translations that are dependent on the users of the terminal, with the corresponding users, some of the users having different associated logical translations than others of the users; and means, responsive to any one of the users logging on at any one of the terminals, for using the physical translations associated with the one terminal and the logical translations associated with the one logged on user to perform call processing for telecommunications which involve the one terminal.

19. The arrangement of claim 18 wherein:

the means for associating logical translations comprise means for associating logical translations, comprising for each user those attributes that are independent of the terminals used by the user, with the corresponding users, some of the users having different associated logical translations than others of the users.

20. The arrangement of claim 19 wherein:

the logical translations associated with a user define a call-coverage path for the corresponding user, and some of the users have different defined call-coverage paths than others of the users; and the means for using comprise means for redirecting a telecommunication that is unable to be received by the one user to the call-coverage path defined by the logical translations associated with the one user.

21. The arrangement of claim 18 wherein:

the means for associating physical translations permanently associate the physical translations with the corresponding terminals;

the means for associating logical translations permanently associate the logical translations with the corresponding users, wherein some of the users have different permanently associated logical translations than others of the users;

the means for logging on comprise means, responsive to the logging on of the one user, for temporarily associating the one user's logical translations with the one terminal; and the means for using comprise means for using the physical translations permanently associated with the one terminal and the logical translations temporarily associated with the one terminal to perform call processing for telecommunications which involve the one terminal.

22. The arrangement of claim 21 further comprising means, responsive to the one user logging off at the one terminal, for disassociating the logical translations of the one user from the one terminal.

23. An arrangement for facilitating use of individual ports by a plurality of different users in a telecommunications system that includes a plurality of the ports for interfacing user terminals to the system and terminal translations that define attributes that are assigned to corresponding ports, comprising:

means for associating physical translations, comprising for each port those terminal translations that are independent of users of the terminal which is interfaced by the port, with the corresponding ports;

means for associating logical translations, comprising for each port those terminal translations that are dependent on the users of the terminal which is interfaced by the port, with the corresponding users, some of the users having different associated logical translations than others of the users; and means, responsive to any one of the users logging on at the terminal which is interfaced by any one of the ports, for using the physical translations associated with the one port and the logical translations associated with the one logged on user to perform call processing for telecommunications which involve the one port.

24. In a telecommunications system that includes a plurality of user terminals, terminal translations that define attributes of the individual terminals, and call processing that uses terminal translations associated with an individual terminal to process telecommunications involving the individual terminal, an improvement for facilitating use of the individual terminals by a plurality of different users, comprising:

means for permanently associating physical translations, comprising for each terminal those terminal translations that are independent of users of the terminal, with the corresponding terminals;

means for permanently associating default terminal translations, comprising for each terminal those terminal translations that are dependent on the users of the terminal, with the corresponding terminals;

means for associating logical translations, comprising for each user those terminal translations that are independent of the terminals used by the user, with corresponding users, some of the users having different associated logical translations than others of the users; and means, responsive to any one of the users logging on at any one of the terminals, for temporarily associating the one user's logical translations with the one terminal.

25. The improvement of claim 24 further comprising:
means in the call processing, responsive to a telecommunication involving the one terminal, for using the physical and only one of the logical and the default terminal translations that are associated with the one terminal to perform call processing for the telecommunication.

26. The improvement of claim 24 further comprising:
means, responsive to the one user logging off at the one terminal, for disassociating the one user's logical translations from the one terminal.

27. An arrangement for facilitating use of individual user terminals by a plurality of different users in a telecommunications system that includes a plurality of the terminals and terminal translations that define attributes of the individual terminals, comprising:
means for associating physical translations, comprising for each terminal those terminal translations that are independent of users of the terminal, with the corresponding terminals, some of the terminals having different associated physical translations than others of the terminals;
means for associating logical translations, comprising for each user those terminal translations that are independent of the terminals used by the user, with the corresponding users, some of the users having different associated logical translations than others of the users; and
means, responsive to any one of the users logging on at any one of the terminals, for using the physical translations associated with the one terminal and the logical translations associated with the one logged on user to perform call processing for telecommunications which involve the one terminal.

28. The arrangement of claim 27 wherein:
the logical translations associated with a user define a call-coverage path for the corresponding user, and some of the users have different defined call-coverage paths than others of the users; and
the means for using comprise
first means for redirecting a telecommunication that is unable to be received by the one user to the call-coverage path defined by the logical translations associated with the one user.

29. The arrangement of claim 27 wherein:
the means for associating physical translations permanently associate the physical translations with the corresponding terminals;
the means for associating the logical translations permanently associate the logical translations with the corresponding users, wherein some of the users have different permanently associated logical translations than others of the users; and
the using means comprise
means, responsive to the logging on of the one user, for temporarily associating the one user's logical translations with the one terminal, and
means for using the physical and logical translations that are presently associated with the one terminal to perform call processing for telecommunications which involve the one terminal.

30. The arrangement of claim 27 wherein:
the means for associating logical translations comprise
means for associating each terminal's default terminal translations, comprising for each terminal those terminal translations that are dependent on the users of the terminal, with the corresponding terminals, and
means for associating each user's logical translations, comprising for each user those terminal translations that are independent of the terminals used by the user, with the corresponding users; and
the using means are further responsive to absence of one of the users being logged on at the one terminal, for using the physical translations associated with the one terminal and the default terminal translations associated with the one terminal to perform call processing for telecommunications which involve the one terminal.

31. The arrangement of claim 30 wherein:
the using means are responsive to the logging on by using the physical translations associated with the one terminal and the logical translations associated with the one logged on user to perform call processing for telecommunications originating at the one terminal, and are responsive to absence of one of the users being logged on at the one terminal by using the physical translations associated with the one terminal and the default terminal translations associated with the one terminal to perform call processing for telecommunications originating at the one terminal.

32. The arrangement of claim 27 wherein:
the physical translations associated with the corresponding terminals comprise for each terminal a physical extension number;
the means for associating logical translations comprise
means for associating each terminal's default terminal translations, comprising for each terminal those terminal translations that are dependent on the users of the terminal, with the corresponding terminals, and
means for associating each user's logical translations, comprising for each user those terminal translations that are independent of the terminals used by the user and including a logical extension number, with the corresponding users, at least some of the users having different logical extension numbers than others of the users, and
the means for using comprise
second means, responsive to any one of the users being logged on at any one of the terminals, for using the physical translations associated with the one terminal and the logical translations associated with the one logged on user to perform call processing for telecommunications originating at the one terminal,
third means for using the physical translations associated with the one terminal and the logical translations associated with the one logged on user to perform call processing for telecommunications addressed to the logical extension number of the one user,
fourth means, responsive to absence of one of the users being logged on at the one terminal, for using the physical and the default terminal translations associated with the one terminal to perform call processing for telecommunications originating at the one terminal, and
fifth means for using the physical and the default terminal translations associated with the one terminal to perform call processing for telecommunications addressed to the physical extension number of the one terminal.

33. The arrangement of claim 32 wherein:

the logical translations associated with a user define a call-coverage path for the corresponding user, and some of the users have different defined call-coverage paths than others of the users; and the third means include means for redirecting telecommunications addressed to the logical extension number of the one user to the call-coverage path defined by the logical translations associated with the one user, in an absence of the one user being logged on at one of the terminals.

34. The arrangement of claim 32 wherein:

the default terminal translations associated with a terminal define a call-coverage path for the corresponding terminal;

the logical translations associated with a user define a call-coverage path for the corresponding user, and some of the users have different defined call-coverage paths than others of the users;

the third means include means for redirecting a telecommunication addressed to the logical extension of the one logged on user to the call-coverage path defined by the logical translations associated with the one user, when the telecommunication is unable to be received at the one terminal, and means for redirecting a telecommunication addressed to the logical extension number of the one user to the call-coverage path defined by the logical translations associated with the one user, in an absence of the one user being logged on at one of the terminals; and the fifth means include means for redirecting a telecommunication addressed to the physical extension of the one terminal to the call-coverage path defined by the default terminal translations associated with the one terminal when the telecommunication is unable to be received at the one terminal.

* * * * *